Figure 1:
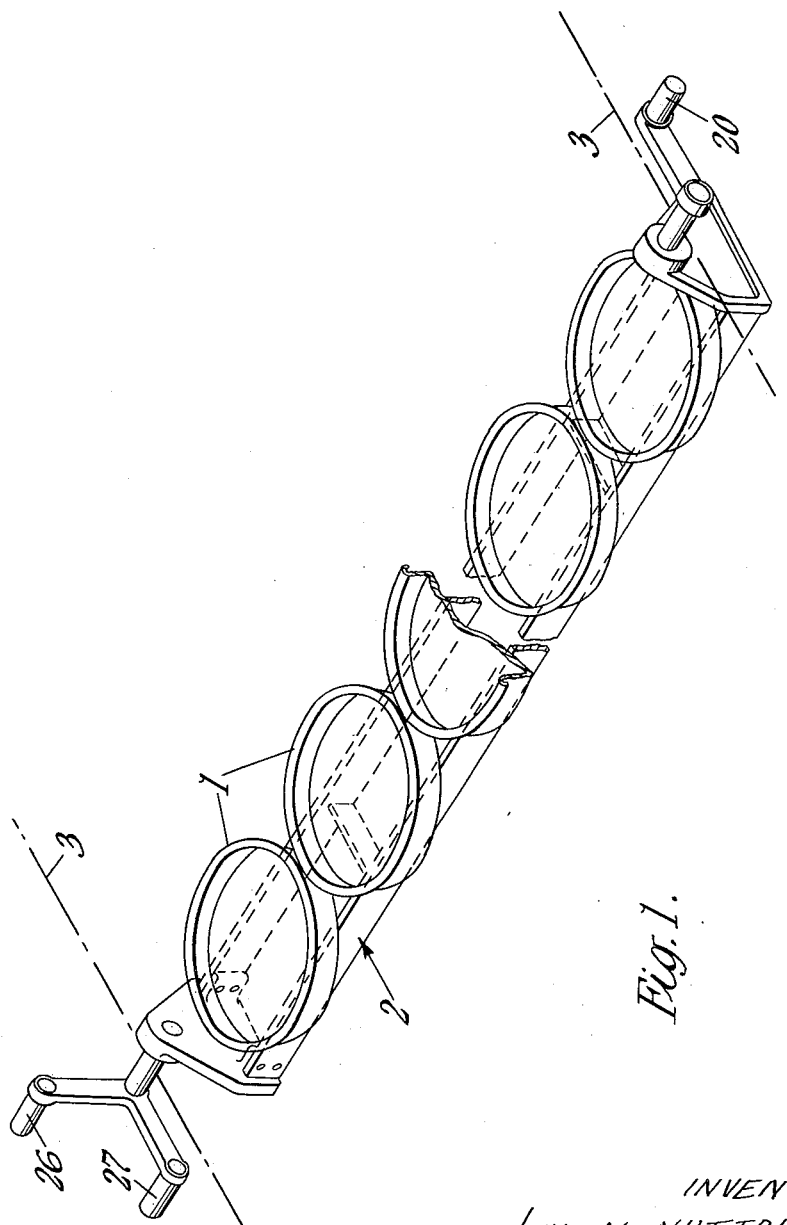

July 30, 1963   J. M. NUTTALL   3,099,345
DETINNING BAKERY GOODS

Filed Aug. 30, 1960   4 Sheets-Sheet 1

INVENTOR
JOHN M. NUTTALL
BY
Learman, Learman, & McCulloch
ATTORNEYS

United States Patent Office 3,099,345
Patented July 30, 1963

3,099,345
DETINNING BAKERY GOODS
John M. Nuttall, Peterborough, Northampton, England, assignor to Baker Perkins Incorporated, Saginaw, Mich.
Filed Aug. 30, 1960, Ser. No. 52,856
Claims priority, application Great Britain Sept. 7, 1959
7 Claims. (Cl. 198—145)

This invention relates to apparatus for removing (hereinafter referred to as detinning), bakery goods from the tins, pans or other containers (hereinafter referred to as tins) in which they are baked, the tins being of the type, known as "swing-tray," in which the tins or tin assemblies are carried between conveyor chains located one on each side of the oven and from the links of which they are pivotally suspended.

More particularly the invention is concerned with apparatus for detinning cakes of relatively thin depth, such as are used in a stacked relationship for the production of layer cake.

An object of the present invention is to provide a simple and effective apparatus for detinning cakes from the tins in which they are baked and conveying the detinned cakes and empty tins along different paths.

The invention consists in detinning apparatus for use with a swing-tray oven conveyor for removing bakery goods from the conveyor-borne trays, tins or pans in which they are cooked, comprising a rotary polygonal drum around which the swing tray conveyor passes to turn through at least 180°, the length of each of the drum faces, measured peripherally of the drum, corresponding to the width of a tray, endless band apron means cooperating with the drum to overlie the open tops (and contents) of the trays as they become inverted in passing round the drum and diverging from the path of the trays after inversion to convey the detinned contents of the trays away from the trays and means adjacent the drum for causing the trays, as they pass round the drum, to be progressively inverted about their pivotal suspension points on the conveyor.

The invention further consists in detinning apparatus according to the preceding paragraph, wherein the polygonal drum is of skeleton form and comprises sprocket wheels of drum diameter at each end of the drum and around which the chains of the swing-tray conveyor pass and bearer struts located and extending between the sprocket wheels parallel to the axis thereof and extending radially of the drum at equally spaced intervals around the drum corresponding to the pitch between the pivotal points of successive swing-trays on the conveyor chains, the bearer struts each extending radially of the drum to a position radially outward of the drum such that the endless band apron spans the gap between one bearer strut and the next to lie in flat plane facets tangential to the drum and closely overlying the top of the swing-tray and the cakes therein, the arrangement being such that the swing-tray conveyor and the bearer struts on the polygonal drum are synchronised so that each swing-tray lies equidistantly between adjacent pairs of bearer struts.

The invention still further consists in detinning apparatus, as set out in the two preceding paragraphs, wherein each swing-tray has, at one end at least, a projecting member extending beyond the supporting conveyor chain and radially spaced from the pivotal axis of the swing tray on the chains and wherein guide rail means engageable by the projecting member are provided on the path of the trays leading to, passing around and leaving the polygonal drum whereby the swing-trays are maintained level up to the drum, caused to be inverted as they pass through 180° of movement round the drum, and maintained inverted after leaving the drum until they are clear of the cakes detinned therefrom.

According to a preferred form of the invention the inverted empty trays (tins) are carried from the lowermost level of the polygonal drum along a substantially horizontal path and the cakes detinned therefrom are carried on the apron which extends from beneath the polygonal drum along a downwardly inclined path below the path of the empty trays (tins), so that the cakes become disassociated from the trays.

Figure 2:
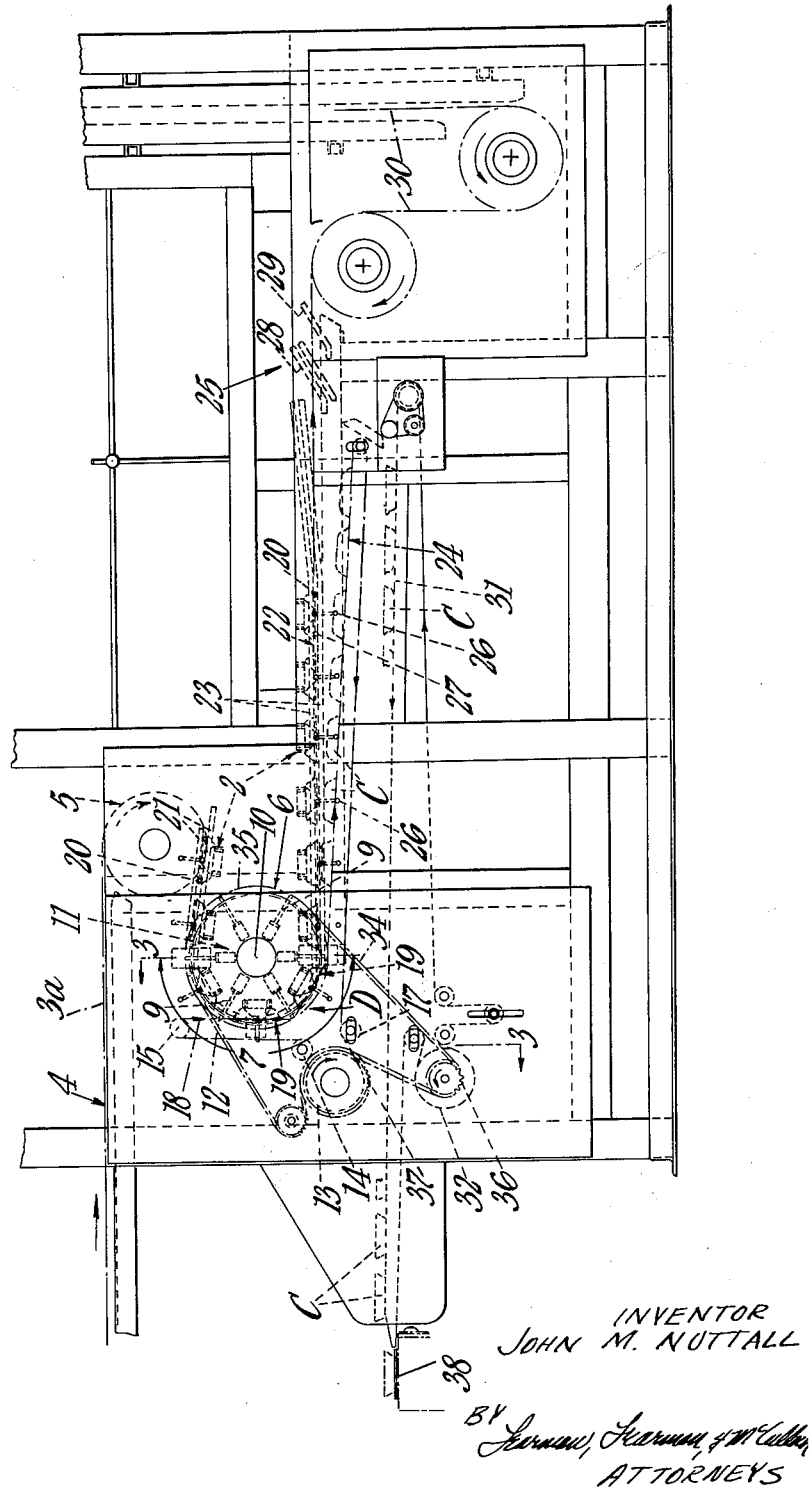
Figure 3:
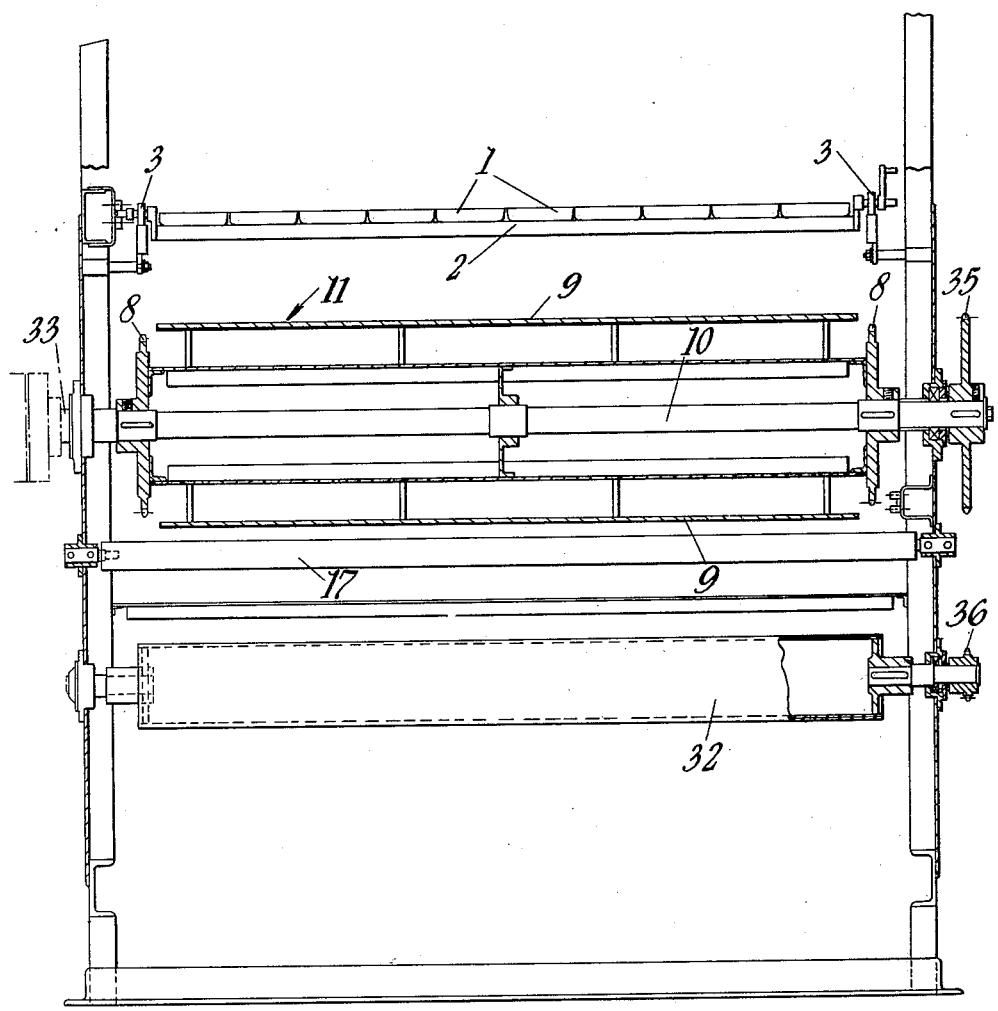
Figure 4:
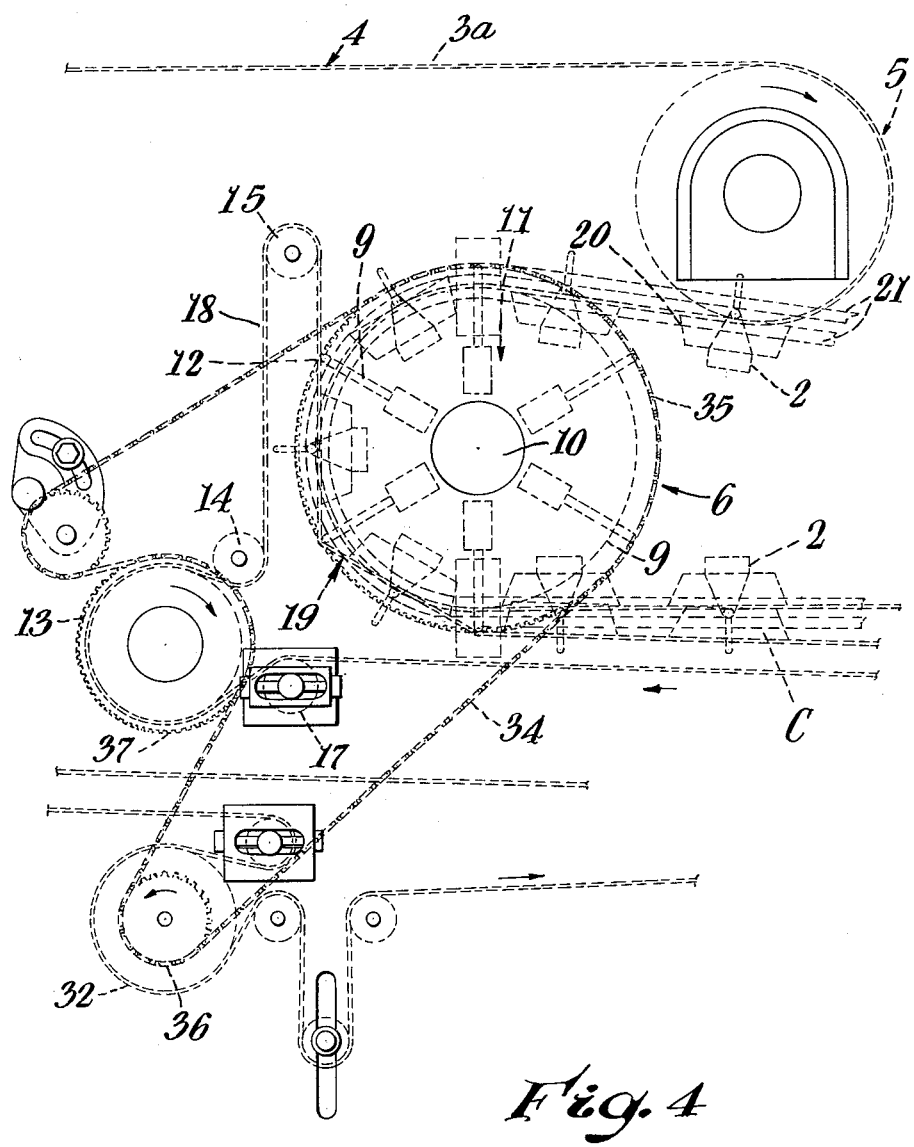

In the accompanying drawings:
FIGURE 1 is a perspective view of a single swing tray element for use with the detinning apparatus of the present invention,
FIGURE 2 is a side elevation of a detinning apparatus according to the present invention, and
FIGURE 3 is a cross sectional elevational view on the line 3—3 of FIGURE 2.
FIGURE 4 is an enlarged side elevation of the apparatus shown at the left hand end of FIGURE 2.

In carrying the invention into effect according to one mode by way of example, cakes C, for example cake layers for the production of layer cake, are baked in shallow tins 1 which are affixed to and carried on swing-tray structures 2 pivotally suspended between a spaced pair of endless conveyor chains indicated by chain-dot lines 3 in FIGURE 1, such that the trays and tins are normally maintained horizontal throughout the run of the conveyor in known manner.

In coming from the oven (not shown) the cake conveyor 3a passes along a horizontal initial stretch 4, round a turning point 5 to change direction by 180° and thence round a second turning point 6 which again reverses the direction of the conveyor by 180° so that the conveyor 3a emerges from the second turning point 6 to run as in the original direction but on a line spaced below the initial stretch 4 by a distance which is substantially the sum of the diameter of the turning circles about the two turning points 5 and 6. In this way the cake conveyor 3a passes along a generally S-shaped path when viewed in side elevation and the turning circle arc 7 over which the conveyor 3a passes at the second turning point 6 comprises the de-tinning station D whereat the mechanisms now to be described are located.

The second turning point 6 comprises two spaced sprocket wheels 8 (see FIGURE 3), having a diameter of, say, 20 to 24 inches, around which the chains of the conveyor 3a pass on leaving the first turning point 5. Between the two sprocket wheels 8, a plurality of bearer struts 9 extend parallel to the axis 10 of the sprocket wheels 8 and extend radially of the sprocket wheels at equally spaced intervals around their peripheries. The bearer struts 9, together with the sprocket wheels 8, form a polygonal drum-like structure (indicated in FIGURES 2 and 3 by the general reference 11) around which the swing trays 2 pass for the purpose of detinning the cakes therein. Each bearer strut 9 extends radially of the drum structure 11 to a position radially outward of the drum structure periphery so as to present a paddle-wheel-like appearance (see FIGURE 2) and the circumferential spacing between the bearer struts 9, i.e. at or near the pitch circle of the sprocket wheels 8, is equal to the pitch between the swing trays 2 on the conveyor 3a. Thus, the conveyor 3a, in passing around the drum structure 11, locates each swing tray 2 centrally between a pair of bearer struts 9.

Adjacent the drum-like structure 11 of the second turning point 6, an endless band apron 12, for example of textile sheet, driven at the same linear speed as the swing-tray conveyor 3a, is carried by rolls 13, 14, 15, 16 and 17 on a path which includes a run 18 which passes around, and in contact with the drum structure 11, at least the lower 90° arc of the path of the swing-tray conveyor 3a around the second turning point 6. Due to the provision of the bearer struts 9 on the drum structure 11, the apron 12, when in contact with the drum structure 11, is guided to lie in flat plane facets 19 tangential to the drum structure 11 between the bearer struts 9 so that the apron facets closely overlie the tops of the swing-tray tins 1, and the cakes therein, which are at that moment located between pairs of bearer struts 9 in the lower 90° arc referred to above. The purpose of the apron 12, as will be seen, is to receive the cakes from the swing-tray tins 1 as and after the cakes become displaced from the tins.

In order to cause the cakes C to become displaced from the swing tray tins 1, the swing trays 2 are caused to become inverted as they pass around the drum-like structure 11 of the second turning point 6 and to this end each swing tray 2 is provided with a forwardly-projecting offset crank pin 20 which engages stationary guide means 21 extending around the second turning point 6 so that each tray 2 is no longer allowed to maintain its normal horizontality as it passes around the drum structure 11 but is caused to assume positions which are substantially tangential to the drum structure 11 as it passes therearound, each tray 2 being fully inverted by the time the conveyor 3a leaves the second turning point 6.

The path of the endless apron 12 referred to above is such that as each tray 2 becomes half-inverted, a facet 19, formed on the apron 12 and spanning the two bearer struts 9 between which the half-inverted tray 2 is located, closes-in the open tins 1 on the tray, so that as the tray becomes further inverted and the cakes C therein come loose from their tins in consequence, the cakes C are supported by and carried on the apron 12.

At the end of the 180° path 7 around the second turning point 6, the swing-tray conveyor 3a continues on in a substantially horizontal path 22, which the trays 2 thereon are maintained inverted by an extension 23 of the guide means 21 referred to above. The apron 12 however continues on along a path 24 which is beneath the conveyor path 22 and downwardly inclined so that the distance between the paths of the swing-tray conveyor 3a and the apron 12 increases progressively. In this way, the detinned cakes C are carried away from the trays 2, which are maintained inverted until they reach a point 25 where they are caused to swing back to their normal position without touching or damaging the detinned cakes by the engagement of projecting offset crank pins 26 and 27 with tray-inverting guide means 28 and 29.

The swing-tray conveyor 3a continues on a path 30 in which the empty tins are processed for re-use and the detinned cakes C are carried away by further conveyor means 31, below the apron path 24, on to which the cakes C, which are inverted on the apron 12, fall and right themselves. The conveyor means 31 transfers the cakes C to a cross-conveyor 38 for further treatment.

The conveyor means 31 passes round a driving roll 32 and the conveyor means 31 and the apron 12 are driven in timed relationship to the rotation of the drum structure 11, to which a main drive is applied from a shaft 33 (FIGURE 3), by means of a chain drive 34 passing around a sprocket wheel 35 on the shaft 10 of the drum structure 11, a sprocket wheel 36 on the roll 32 of the conveyor means 31 and a sprocket wheel 37 on the roll 13 of the apron 12.

I claim:
1. In combination with conveyor means on which is swingably supported at least one open top tray in upright position: detinning apparatus comprising rotatable drum means providing a turning point and around which said conveyor means is entrained substantially 180° to form two vertically spaced, substantially horizontal runs; tray engaging means supported in the path of movement of said tray at said turning point and operable to prevent swinging movement thereof, whereby said tray moves from said upright position to an inverted position as said conveyor means passes around said drum means; and endless band means supported adjacent said drum means in a position to overlie the open top of said tray as the latter moves to its inverted position so as to receive the contents of said tray.

2. Apparatus as set forth in claim 1 including means for guiding said conveyor means and said band means along diverging paths in a direction away from said drum means.

3. Apparatus as set forth in claim 2 including means supported adjacent the diverging path of said conveyor means for returning said tray to its upright position.

4. Apparatus as set forth in claim 1 wherein said drum means comprises bearer struts extending substantially radially of the axis of said drum means and being spaced apart a distance to receive said tray therebetween.

5. Detinning apparatus for use with conveyor means having a substantially horizontal run, said apparatus comprising at least one open top tray; means swingably mounting said tray on said conveyor means for swinging movements relative thereto so that said tray normally occupies an upright position; drum means rotatable about an axis and around which said conveyor means is entrained, said drum means defining one end of said run of said conveyor means and turning the latter to provide a reverse run; means at said one end of said run engageable with said tray and operable to prevent swinging movement thereof, whereby said tray moves from its upright position to an inverted position as said tray passes around said drum means; band means adjacent said drum means operable to overlie the open top of said tray as it becomes inverted for receiving the contents of said tray; and means driving said band means at the same rate of speed and in the same direction of movement as said conveyor means.

6. Apparatus as set forth in claim 5 wherein the means at said one end of said run comprises bearer struts supported by said drum means and extending substantially radially of the axis thereof and being peripherally spaced apart a distance to receive said tray therebetween.

7. Apparatus as set forth in claim 5 wherein the means at said one end of said run comprises fixed guide means; and cooperable guide means on said tray engageable with said fixed guide means.

References Cited in the file of this patent

UNITED STATES PATENTS

| | | |
|---|---|---|
| 1,393,003 | Ayres et al. | Oct. 11, 1921 |
| 2,561,775 | Bausman | July 24, 1951 |
| 2,640,444 | Reget | June 2, 1953 |
| 2,747,724 | Kornylak | May 29, 1956 |
| 2,951,603 | Preuss | Sept. 6, 1960 |